Patented Mar. 3, 1942

2,275,376

UNITED STATES PATENT OFFICE 2,275,376

FLOOR TILE AND PROCESS OF MAKING SAME

Carleton Ellis, Montclair, N. J., assignor to Ellis-Foster Company, a corporation of New Jersey No Drawing. Application January 11, 1937, Serial No. 120,142

6 Claims. (Cl. 106—219)

This invention relates to resinous compositions containing mineral fillers and capable of being sheeted by passing between hot pressure rolls, to form flooring tiles. In particular the invention relates to such compositions containing a plasticized rosin ester as the binder.

One object is to provide a light-colored binder such that tiles of lighter color can be obtained than with the formerly proposed products containing asphalt as binder. Another object is to provide a cheap composition for floor tile that can be washed with the usual agents used in cleaning floors without damage of the surface.

A preferred way of carrying out the invention is to heat a rosin ester, preferably rosin glyceride or so-called ester gum, with a quantity of a miscible plasticizing agent of low saponifiability until the softening point of the mixture as measured by the "ball and ring" method is between about 80° and 110° C., or preferably between 85° and 105° C. The binder thus formed, and sufficient fillers and pigments to give the desired hardness and color, are charged into a mixer, preferably a heated mixer of the Banbury type, and mixed until homogeneous. The charge is then worked until smooth on hot milling rolls such as are used in the compounding of rubber. A slab of the plastic composition is then cut from the rolls and passed through a train of sheeting and calender rolls to form a smooth ribbon of definite uniform thickness, say 1/8 or 3/16 inch, from which squares or other shapes of desired tile size are stamped. The tiles are then allowed to cool.

Pitches such as stearin pitch are used as plasticizers in asphalt tile. They are usually dark colored although there are certain grades which are of a brown shade, these being more expensive. Vegetable pitches show saponifiability to an undesirable degree in contact with alkalies.

As plasticizing agents I prefer to use bodies having relatively light color and showing a relatively low degree of saponification. Agents which have been found suitable include complexes produced from the reaction product of tung oil and maleic acid (for example, tung oil-maleic acid treated with castor oil), factis compositions (for example, a sulphur chloride-treated glycerol ester of rosin and linseed oil acids, or a jojoba oil factis), gelled drying oils or drying oil alkyd resins which can be dispersed in ester gum by heat, gelled castor oil, or gelled tung oil esters such as those produced, for example, by heating a mixture of tung oil and tung oil acid at a high temperature until combination has occurred and esterifying the product with a polyhydric alcohol. Another plasticizer is illustrated by a polymerized tung-glycol ester.

By "plasticizer," as said term is used in the present case, is meant a miscible body which preferably produces a toughening of the composition, as well as softening, in contrast with the effect produced by substances such as high-boiling liquids which result merely in softening. Hence, one desirable criterion of the plasticizer as used herewith is that it is of a rubbery nature. A flooring must be hard enough to stand wear but a composition of stoney hardness is cold and uncomfortable underfoot. Also a flooring must have a certain reversible resiliency such that heavy objects do not produce a permanent dent if left on the floor a long time. The above plasticizing agents are therefore in such form that they are of a rubbery nature but still miscible with ester gum.

Although rosin glyceride is the preferred resin, other polyhydric alcohol esters of rosin can be used, as well as rosin esters modified with alkyd or phenol-aldehyde resins, or rosin reacted with maleic acid and esterified. Where price is not a determining factor, vinyl resins can be incorporated for increased toughness.

Fillers include asbestos in powdered or fibrous form. The grades known as floats are satisfactory. With asbestos is used a powdered mineral of light color such as ground limestone, clay or slate; silex or fine sand. Also, a proportion of organic filler such as wood flour or powdered rubber can be employed if desired. In general, the mineral fillers constitute from about 60 to 75 per cent of the final composition. With a light-colored tile base, only a relatively small proportion of pigment is needed depending upon the tinting strength of the latter, and any desired color may be used, provided the pigment is stable at tile-forming temperatures, is non-fading and resistant to cleaning operations.

Tile-forming temperatures are high enough so that the composition compacts and sheets satisfactorily. In general the mixing and sheeting temperature is between about 80° and 110° C., depending upon the fusibility of the binder.

The following examples are given as illustrative of the above and are not to be considered as limiting.

*Example 1.*—A mixture of 300 parts ester gum and 100 parts linseed oil was treated with 30 parts sulphur chloride. 10 parts of the resulting product was mixed with 100 parts ester gum and heated at 100° C. for 1 hour. The binder thus obtained was light amber in color, had a softening point of 85° C. and a film thereof was not affected by 5% sodium hydroxide solution during 2 days' immersion.

Thirty-eight parts of the above binder was mixed with 35 parts powdered limestone and 65 parts asbestos floats and when warm was passed through rolls heated to about 100° C. The resulting sheet (⅛ inch thick) was cut into tiles. These were smooth, hard, strong and of light color.

*Example 2.*—A mixture of 300 parts castor oil and 94 parts tung oil was heated to 160° C. and, after 24 parts maleic acid was added, the temperature was taken to 260° C. 5 parts of this plasticizer was added to 100 parts ester gum, the mixture constituting a light-amber tile binder of softening point 80° C. A film of this composition withstood the action of 5% caustic soda over a period of days in comparison with a film of stearin pitch which under the same conditions turned gray within a few minutes.

This binder was mixed with mineral fillers in the same way as in Example 1. With the addition of a small amount of titanox, a light-colored tile was formed which was hard, strong and smooth.

What I claim is:

1. A composition flooring tile comprising as a binder, rosin glyceride and a reaction product of castor oil and a tung oil-maleic acid compound.

2. A light-colored flooring tile composed essentially of a composition comprising a rosin ester as the principal binder, a substance acting on this as a plasticizing agent of low saponifiability miscible therewith, which composition contains about 60 to 75% of solid mineral filler, and which can be sheeted under heat and pressure, and said plasticizing agent being a substance selected from the group consisting of the reaction product of tung oil with maleic acid, treated with castor oil, factis compositions, gelled drying oil, drying oil alkyd resins, gelled castor oil, gelled tung oil esters and polymerized tung-glycol ester, said plasticizer being of a rubbery nature and adapted to produce a toughening of said tile composition.

3. A light colored floor tile containing about 60 to 75% of mineral filler, and composed of a composition that can be sheeted under pressure, such composition containing as the principal binder, rosin ester and a plasticizing agent therefor, which plasticizing agent is of low saponifiability, such floor tile being of a light color and being resistant to alkaline detergents of the type commonly used in scrubbing floors, and said plasticizing agent being a substance selected from the group consisting of the reaction product of tung oil with maleic acid, treated with castor oil, factis compositions, gelled drying oil, drying oil alkyd resins, gelled castor oil, gelled tung oil esters and polymerized tung-glycol ester, said plasticizer being of a rubbery nature and adapted to produce a toughening of said tile composition.

4. A composition flooring tile comprising as the essential binder, rosin ester and a vegetable oil factis, said tile containing about 60 to 75% of mineral filler.

5. A floor tile which contains as the principal binder for the solid fillers, a rosin ester, said ester having blended therewith a plasticizing agent therefor, said tile being substantially resistant to alkaline soapy detergents and substantially resistant to 5% caustic alkali solution, said tile containing about 60 to 75% of mineral filler, and said plasticizing agent being a substance selected from the group consisting of the reaction product of tung oil with maleic acid, treated with castor oil, factis compositions, gelled drying oil, drying oil alkyd resins, gelled castor oil, gelled tung oil esters and polymerized tung-glycol ester, said plasticizer being of a rubbery nature and adapted to produce a toughening of said tile composition.

6. The process of forming a flooring tile which comprises mixing in a heated state a mixture comprising rosin glyceride, a plasticizing agent therefor of low saponifiability miscible therewith, mineral fillers and pigments, and sheeting said material hot by application of pressure thereto, the rosin glyceride being the principal binder present in said mixture, and said mixture containing about 60 to 75% of mineral filler, and said plasticizing agent being a substance selected from the group consisting of the reaction product of tung oil with maleic acid, treated with castor oil, factis compositions, gelled drying oil, drying oil alkyd resins, gelled castor oil, gelled tung oil esters and polymerized tung-glycol ester, said plasticizer being of a rubbery nature and adapted to produce a toughening of said tile composition.

CARLETON ELLIS.